United States Patent
Tulasi et al.

(10) Patent No.: US 9,479,479 B1
(45) Date of Patent: Oct. 25, 2016

(54) DETECTOR TREE FOR DETECTING RULE ANOMALIES IN A FIREWALL POLICY

(71) Applicant: Juniper Networks, Inc., Sunnyvale, CA (US)

(72) Inventors: Vinuth Tulasi, Bangalore (IN); Arnav Shrivastava, Bangalore (IN); Srivathsa Sarangapani, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 202 days.

(21) Appl. No.: 14/496,666

(22) Filed: Sep. 25, 2014

(51) Int. Cl.
  *G06F 17/00* (2006.01)
  *H04L 29/06* (2006.01)
(52) U.S. Cl.
  CPC ............... *H04L 63/0263* (2013.01)
(58) Field of Classification Search
  CPC ................................. H04L 63/0263
  USPC .............................................. 726/1
  See application file for complete search history.

(56) References Cited

U.S. PATENT DOCUMENTS

| | | | |
|---|---|---|---|
| 7,441,022 B1 | 10/2008 | Schuba et al. | |
| 7,505,463 B2 | 3/2009 | Schuba et al. | |
| 8,176,561 B1 | 5/2012 | Hurst et al. | |
| 8,327,414 B2 | 12/2012 | Strassner et al. | |
| 2006/0010439 A1 | 1/2006 | Majidian | |
| 2009/0138960 A1* | 5/2009 | Felty | H04L 63/0263 726/14 |
| 2012/0192246 A1* | 7/2012 | Harrison | G06F 21/577 726/1 |

FOREIGN PATENT DOCUMENTS

EP 2 023 566 B1 9/2011

OTHER PUBLICATIONS

Al-Shaer et al., "Design and Implementation of Firewall Policy Advisor Tools," Multimedia Networking Research Laboratory, School of Computer Science, Telecommunications and Information Systems, DePaul University, 2002, 21 pages.
Abedin et al., "Detection and Resolution of Anomalies in Firewall Policy Rules," Department of Computer Science, The University of Texas at Dallas, International Federation for Information Processing, 2006, 15 pages.
Baboescu et al., "Fast and scalable conflict detection for packet classifiers," Department of Computer Science and Engineering, University of California, Jan. 3, 2003, 19 pages.
Liu et al., "Firewall Compressor: An Algorithm for Minimizing Firewall Policies," Department of Computer Science and Engineering, Michigan State University, IEEE, 2008, 9 pages.
Liu et al., "Firewall Queries," Department of Computer Sciences, The University of Texas at Austin, 2005, 16 pages.
Hari et al., "Detecting and Resolving Packet Filter Conflicts," Mar. 2000, 10 pages.

* cited by examiner

*Primary Examiner* — Teshome Hailu
(74) *Attorney, Agent, or Firm* — Harrity & Harrity, LLP

(57) ABSTRACT

A device may receive rule information, associated with a firewall policy, that includes a set of N rules. The device may add a rule, of the set of N rules, to a detector tree associated with the firewall policy. The device may identify other rules to which the rule is to be compared. The other rules may be included in the set of N rules, and may include a quantity of rules approximately equal to a result of a logarithm to base 2 of N. The device may compare the rule and the other rules, and may detect a rule anomaly based on comparing the rule to the other rules. The rule anomaly may be associated with a conflict between the rule and a particular rule of the other rules. The device may identify the rule anomaly within the detector tree, and may output information regarding the rule anomaly.

20 Claims, 14 Drawing Sheets

DETECTOR TREE FOR DETECTING RULE ANOMALIES IN A FIREWALL POLICY

BACKGROUND

A firewall may be described by a firewall policy that includes a set of rules designed to filter incoming and/or outgoing network traffic (e.g., packets). In some implementations, the firewall may act as a barrier between a first network (e.g., a trusted, secure, internal network) and a second network (e.g., a network that is not assumed to be secure and/or trusted, such as the Internet).

SUMMARY

According to some possible implementations, a device may comprise one or more processors to: receive rule information associated with a firewall policy, where the rule information may include a set of N rules; add a rule, of the set of N rules, to a detector tree associated with the firewall policy, where the rule may be added to the detector tree based on a source address, associated with the rule, and a destination address associated with the rule; identify one or more other rules to which the rule is to be compared, where the one or more other rules may be included in the set of N rules, and where the one or more other rules may include a quantity of rules approximately equal to a result of a logarithm to base 2 of N; compare the rule and the one or more other rules; detect a rule anomaly based on comparing the rule to the one or more other rules, where the rule anomaly may be associated with a conflict between the rule and another rule of the one or more other rules; identify the rule anomaly within the detector tree based on detecting the rule anomaly; and output or store information regarding the rule anomaly.

According to some possible implementations, a computer-readable medium may store one or more instructions that, when executed by one or more processors, cause the one or more processors to: receive rule information associated with a firewall policy, where the rule information may include a set of N rules; add a rule, of the set of N rules, to a detector tree associated with the firewall policy, where the rule may be added to the detector tree based on a source address, associated with the rule, and a destination address associated with the rule; identify one or more other rules to which the rule is to be compared, where the one or more other rules may be included in the set of N rules, and where the one or more other rules may include a quantity of rules approximately equal to a result of a logarithm of N; compare the rule and the one or more other rules; detect a rule anomaly based on comparing the rule to the one or more other rules, where the rule anomaly may be associated with a conflict between the rule and another rule of the one or more other rules; and store information associated with the rule anomaly in the detector tree based on detecting the rule anomaly.

According to some possible implementations, a method may include: receiving, by a device, rule information associated with a firewall policy, where the rule information may include a set of N rules; adding, by the device, a rule, of the set of N rules, to a detector tree associated with the firewall policy, where the rule may be added to the detector tree based on a source address, associated with the rule, or a destination address associated with the rule; identify, by the device, a group of rules to which the rule is to be compared, where the group of rules may be included in the set of N rules, and where the group of rules may include a quantity of rules approximately equal to a result of a logarithm to base 2 of N; comparing, by the device, the rule and the group of rules; detecting, by the device, a rule anomaly based on comparing the rule to the group of rules, where the rule anomaly may be associated with a conflict between the rule and another rule of the group of rules; and storing, by the device and based on detecting the rule anomaly, information associated with the rule anomaly within the detector tree.

DETAILED DESCRIPTION

Figure 1:
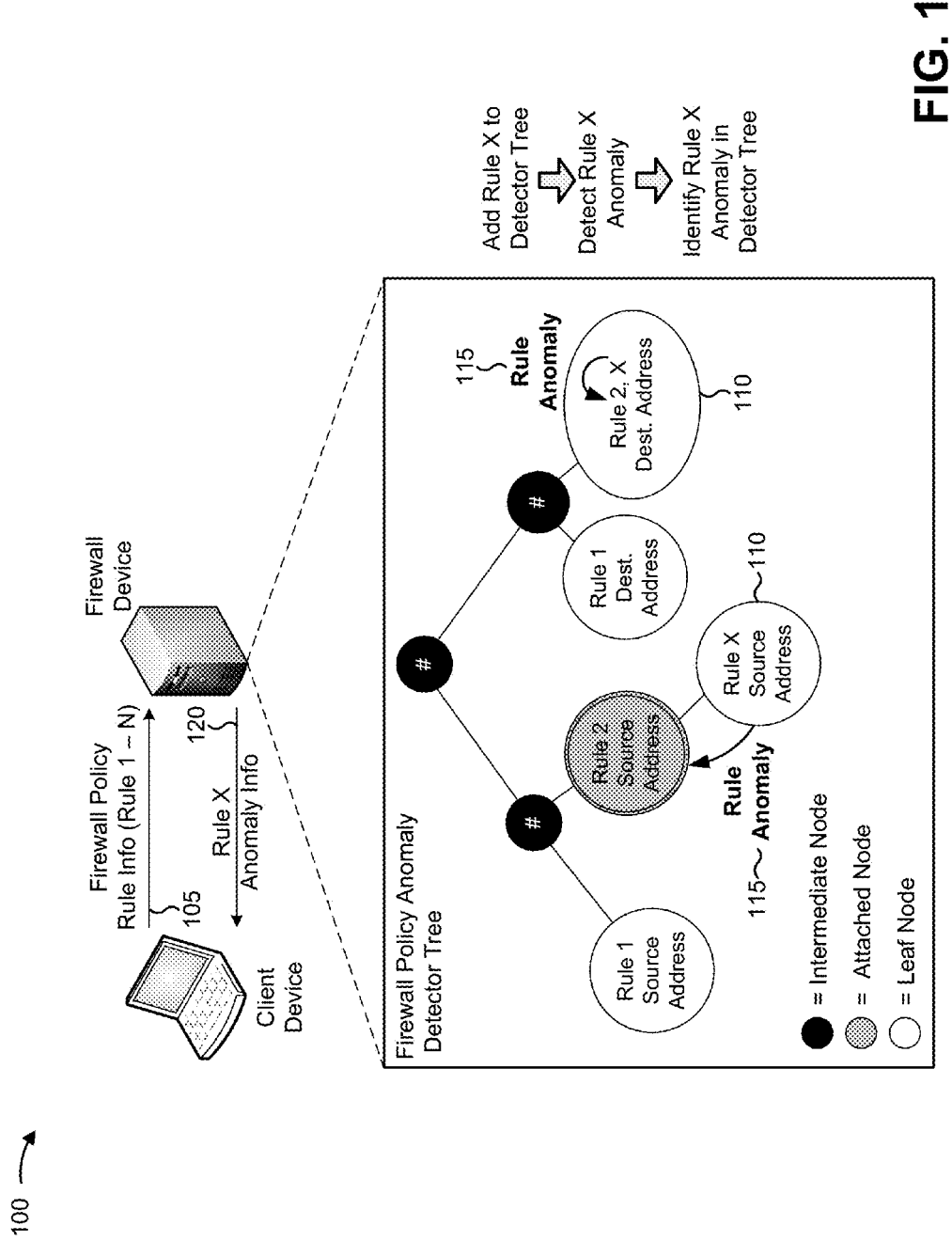
FIG. 1 is a diagram of an overview of an example implementation described herein.

The following detailed description of example implementations refers to the accompanying drawings. The same reference numbers in different drawings may identify the same or similar elements.

A firewall policy may include of a set of rules (e.g., stored or accessible by a firewall device) associated with filtering packets flowing in to or out of a network. A firewall rule may be described by a source network address (e.g., a source internet protocol (IP) address), a destination network address (e.g., a destination IP address), a service (e.g., including a protocol, such as transmission control protocol (TCP), user datagram protocol (UDP), internet control message protocol (ICMP), or the like, a destination port, or the like), and an action (e.g., permit, deny, etc.) that is to be taken with respect to a packet that includes information that matches the source address, the destination address, and the service. In some implementations, a set of rules may be ordered (e.g., based on a set of rule numbers). In some implementations, each rule, of the set of rules, may be associated with a rule number in order to identify the rule order associated with the set of rules. Typically, the first rule in the rule order, that matches information included in a packet, is executed (e.g., the packet may be filtered using the first rule that is found to match the packet).

However, the set of rules that describes the firewall policy may contain one or more rule anomalies (e.g., conflicts between rules included in the rule set). For example, the set of rules may include one or more shadowing anomalies, one or more generalization anomalies, one or more redundancy anomalies, and/or one or more correlation anomalies. Detecting such rule anomalies may be important in order to ensure a desired firewall performance. For example, if a firewall policy includes a quantity of N rules, then a particular rule may be compared to N−1 other rules in order to determine whether the particular rule conflicts with another rule (e.g., this may be repeated for each of other N rules in order to determine whether any rule anomalies exist within the firewall policy, and may be described as an "N-squared" type of problem). As such, detection of such rule anomalies (e.g., by the firewall device) may require a substantial amount of time (e.g., several minutes) and/or another device (e.g., a batch processing device) as the number of rules included in the rule policy increases (e.g., when a firewall policy includes 50,000 rules, a particular rule may need to be compared to 49,999 other rules in order to determine whether the particular rule conflicts with another rule). What is needed is a data structure that allows for a particular rule, included in a set of N rules, to be compared to a small number of the other N−1 rules (e.g., a quantity of rule comparisons approximately equal to a value of log N to detect a rule anomaly). This may allow a rule anomaly, associated with the rule, to be quickly detected (e.g., approximately instantaneously) as compared to a traditional rule anomaly detection method.

Implementations described herein provide a detector tree data structure that organizes rule information, associated with a firewall policy that includes a set of N rules, such that a rule anomaly, associated with a particular rule, may be detected based on a small number of rule comparisons relative to the quantity of N rules.

FIG. 1 is a diagram of an overview of an example implementation 100 described herein. For the purposes of example implementation 100, assume that a user of a client device has provided, as input to the client device, information associated with a set of rules (e.g., rule 1 through rule N (N>1)) included in a firewall policy, and wishes for a firewall device (e.g., associated with managing a firewall described by the firewall policy) to detect rule anomalies based on the rule information.

As shown in FIG. 1, and by reference number 105, the client device may provide the rule information to the firewall device. As shown in the lower portion of FIG. 1, the firewall device may receive the rule information, and may construct a detector tree based on the rule information. As shown, the detector tree may include a group of nodes (e.g., one or more attached nodes, one or more intermediate nodes, and/or one or more leaf nodes). In some implementations, the firewall device may construct the detector tree by comparing rule information, associated with a rule being added to the detector tree, to rule information associated with a rule previously added to the detector tree. Additional details regarding the construction of the detector tree are described below.

As shown by reference number 110, assume that the firewall device is adding rule X (e.g., included in the set of N rules) to the detector tree. As shown, the firewall device may add, based on the rule information associated with rule X, a first leaf node, associated with the rule X source address, and a second leaf node, associated with the rule X destination address, to the detector tree. As shown, the firewall device may determine (e.g., due to the location at which the first leaf node is added and the location at which the second leaf node is added), that a rule anomaly may exist between rule 2 and rule X. As shown by reference number 115, the firewall device may compare rule 2 to rule X and may determine that a rule anomaly exists between rule 2 and rule X. As shown, the firewall device may identify the rule anomaly in the detector tree (e.g., with information linking rule 2 and rule X). Notably, due to the organization of the detector tree, the firewall device needs to compare rule X only to rule 2 in order to determine whether any rule anomaly, associated with rule X, exists (e.g., rather than comparing rule X to every other rule included in the firewall policy). As shown by reference number 120, the firewall device may provide information associated with the detected rule X rule anomaly (e.g., in order to inform the user that the rule anomaly exists).

In this way, a detector tree data structure may organize rule information, associated with a firewall policy that includes a set of N rules, such that a rule anomaly, associated with a particular rule, may be detected based on a small number of rule comparisons (e.g., a number of comparisons approximately equal to a value of log N) relative to the quantity of N rules.

Figure 2:
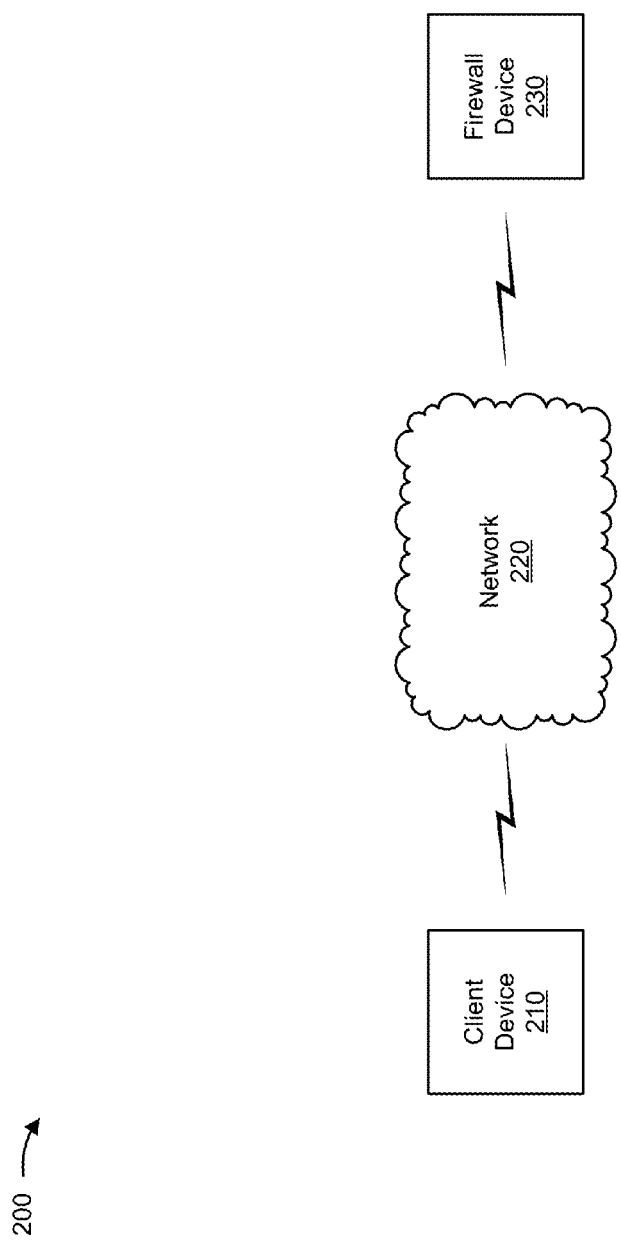
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a network 220, and a firewall device 230. Devices of environment 200 may interconnect via wired connections, wireless connections, or a combination of wired and wireless connections.

Client device 210 may include a device capable of receiving, generating, processing, executing, and/or providing information associated with a firewall policy, such as rule information associated with a rule or a set of rules included in the firewall policy. For example, client device 210 may include a computing device, such as a desktop computer, a laptop computer, a tablet computer, a handheld computer, a server, a mobile phone (e.g., a smart phone, a radiotelephone, etc.), or a similar device. In some implementations, client device 210 may receive information from and/or transmit information to firewall device 230 via network 220.

Network 220 may include one or more wired and/or wireless networks. For example, network 220 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

Firewall device 230 may include a device capable of receiving, generating, processing, storing, and/or providing information associated with a firewall policy, such as detector tree data structure associated with the firewall policy. For example, firewall device 230 may include a server device, a firewall device, or a group of server devices and/or a group of firewall devices. In some implementations, firewall device 230 may be capable of receiving rule information associated with a rule, detecting a rule anomaly associated with the rule, and storing and/or providing information associated with the rule anomaly.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
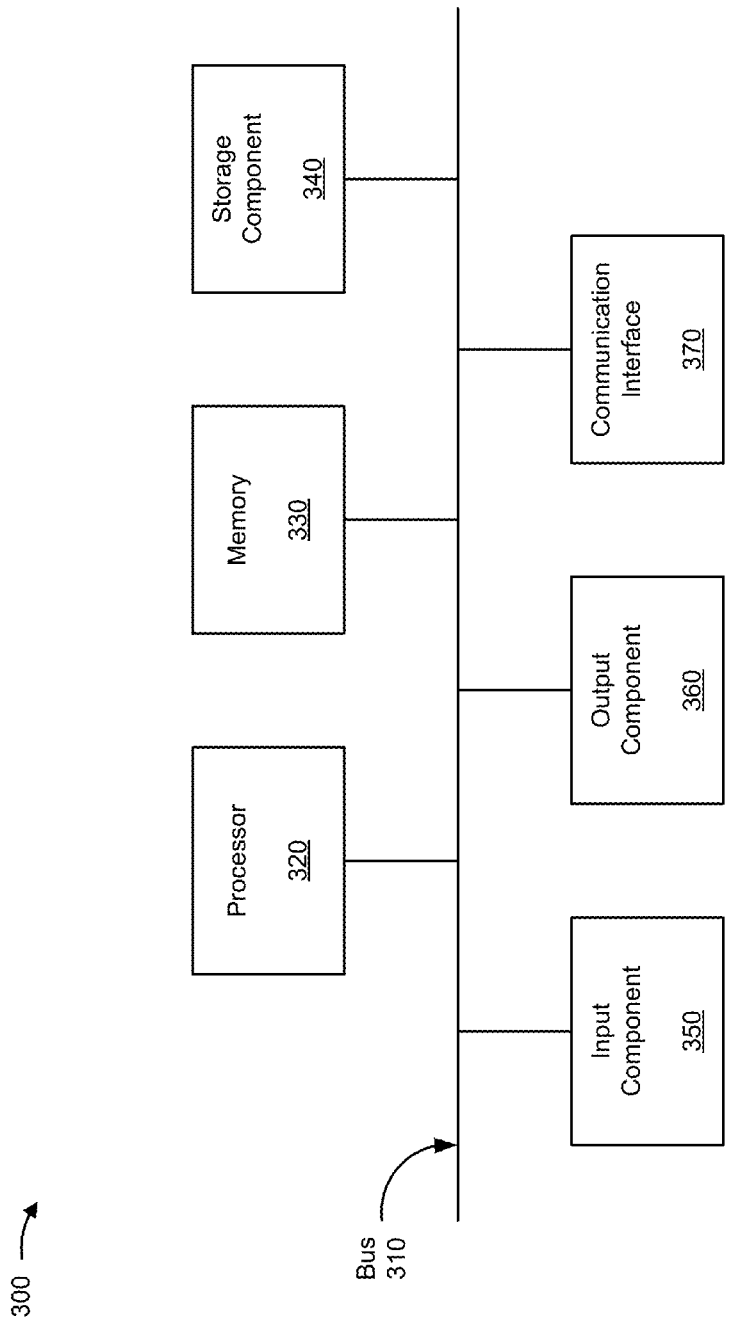
FIG. 3 is a diagram of example components of one or more devices of FIG. 2.

FIG. 3 is a diagram of example components of a device 300. Device 300 may correspond to client device 210 and/or firewall device 230. In some implementations, client device 210 and/or firewall device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
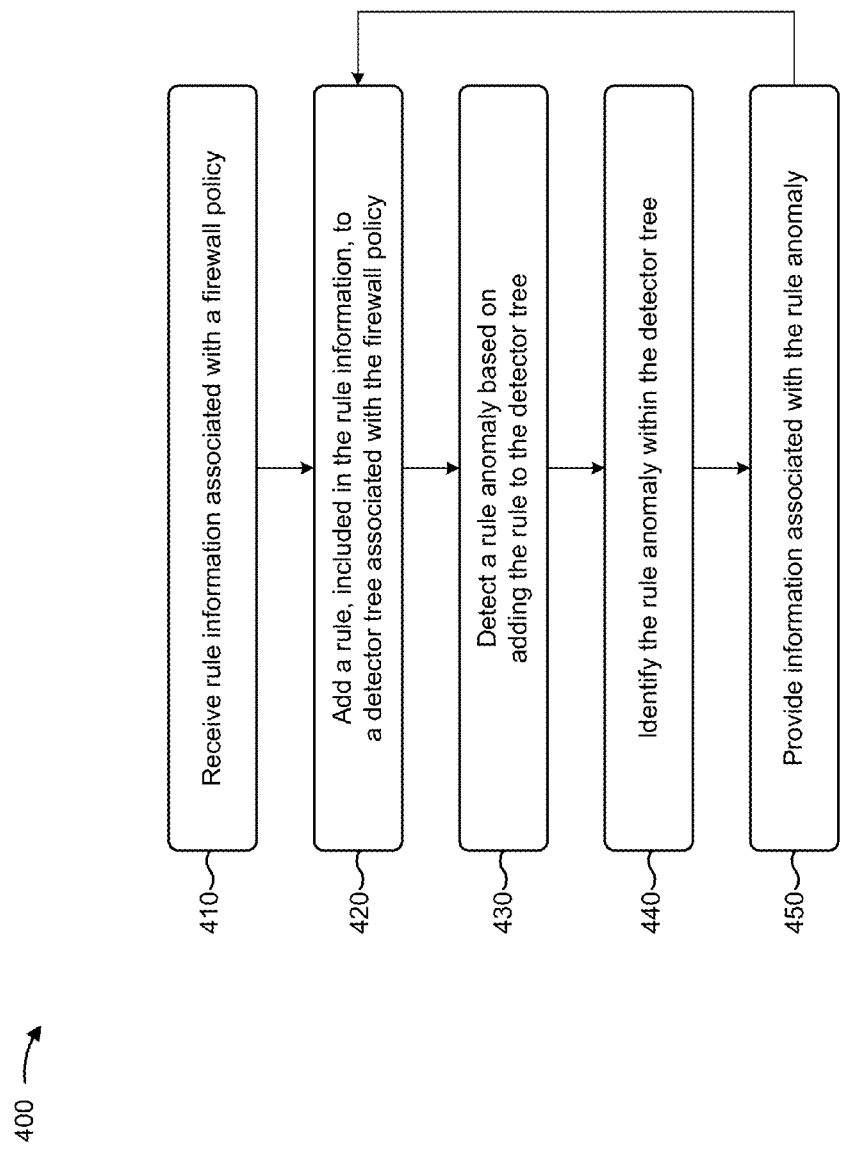
FIG. 4 is a flow chart of an example process for detecting a rule anomaly, associated with a rule included in a firewall policy, and identifying the rule anomaly in a detector tree data structure associated with the firewall policy.

FIG. 4 is a flow chart of an example process 400 for detecting a rule anomaly, associated with a rule included in a firewall policy, and identifying the rule anomaly in a detector tree data structure associated with the firewall policy. In some implementations, one or more process blocks of FIG. 4 may be performed by firewall device 230. In some implementations, one or more process blocks of FIG. 4 may be performed by another device or a group of devices separate from or including firewall device 230, such as client device 210.

As shown in FIG. 4, process 400 may include receiving rule information associated with a firewall policy (block 410). For example, firewall device 230 may receive rule information associated with a firewall policy. In some implementations, firewall device 230 may receive the rule information when a user (e.g., an administrator associated with managing the firewall policy) provides input associated with the rule information. Additionally, or alternatively, firewall device 230 may receive the rule information when the rule information is provided by another device, such as client device 210.

Rule information may include information associated with one or more rules included in a firewall policy. In some implementations, the rule information may include information that defines a rule, such as a rule number, a source address (e.g., a source IP address), a destination address (e.g., a destination IP address), a service (e.g., including protocol type, a port number, etc.), an action (e.g., permit, deny), or the like. In some implementations, the rule information may include information associated with multiple rules (e.g., when firewall device 230 is to construct a detector tree based on the multiple rules). Additionally, or alternatively, the rule information may include information associated with a single rule (e.g., when firewall device 230 is to add the single rule to a detector tree stored or accessible by firewall device 230).

In some implementations, firewall device 230 may store the rule information in a memory location (e.g., a RAM, a ROM, a cache, a hard disk, etc.) of firewall device 230. Additionally, or alternatively, firewall device 230 may provide the rule information to another device for storage. In some implementations, firewall device 230 may store information associated with the rule information such that previous rule information (e.g., rule information, associated with the firewall policy, received at an earlier time) is overwritten and/or deleted. Additionally, or alternatively, firewall device 230 may store the rule information such that firewall device 230 may retrieve the rule information at a later time.

As further shown in FIG. 4, process 400 may include adding a rule, included in the rule information, to a detector tree associated with the firewall policy (block 420). For example, firewall device 230 may add a rule, included in the rule information, to a detector tree associated with the firewall policy. In some implementations, firewall device 230 may add the rule to the detector tree after firewall device 230 receives the rule information. Additionally, or alternatively, firewall device 230 may add the rule to the detector tree when firewall device 230 receives information indicating that firewall device 230 is to add the rule to the detector tree.

A detector tree may include a binary tree data structure that stores information associated with multiple rules, included in a firewall policy, including information that identifies one or more rule anomalies associated with the firewall policy. In some implementations, the detector tree may include a Patricia tie that has been extended to store information associated with the one or more rule anomalies. For example, the detector tree may include a group of connected nodes (e.g., including one or more leaf nodes, one or more attached nodes, one or more intermediate nodes), and one or more nodes, of the group of connected nodes, may include information that identifies a rule anomaly associated with one or more rules corresponding to the one or more nodes.

In some implementations, a node, included in the detector tree, may be configured to store rule information (e.g., associated with a rule included in the rule information) that may be used to detect a rule anomaly associated with the rule. For example, the node may store information that identifies a bit index value associated with navigating the detector tree (e.g., −1, 0, 31, etc.), a network address (e.g., a source IP address or a destination IP address) associated with a rule, a rule number associated with the rule, an address type of the network address (e.g., source or destination), a service associated with the rule (e.g., a protocol, such as TCP, UDP, or ICMP, and/or a port number), an action (e.g., permit, deny) to be taken with regard to a packet that matches the rule, information identifying a shadowing anomaly associated with the rule and another rule (e.g., a shadow link (s-link)), information identifying a generalization anomaly associated with the rule and another rule (e.g., a generalization link (g-link)), information identifying a redundancy anomaly associated with the rule and another rule (e.g., a redundancy link (r-link)), information identifying a correlation anomaly associated with the rule and another rule (e.g., a correlation link (c-link)), and/or another type of information.

In some implementations, the detector tree may include one or more leaf nodes. A leaf node may include a node, included in the detector tree, that is not the parent of any other node in the detector tree. In some implementations, information associated with the rule being added to the detector tree may be compared to information stored in the leaf node (e.g., in order to detect a rule anomaly). Additional details regarding detecting a rule anomaly based on information included in a leaf node are described below. In some implementations, the leaf node may store a network address associated with the rule, a rule number associated with the rule, an address type of the network address, information identifying a service associated with the rule, information identifying an action to be taken with regard to a packet that matches the rule, information identifying a shadowing anomaly associated with the rule and another rule, information identifying a generalization anomaly associated with the rule and another rule, information identifying a correlation anomaly associated with the rule and another rule, information identifying a correlation anomaly associated with the rule and another rule, and/or another type of information. In some implementations, the bit index value of the leaf node may be equal to −1 (e.g., to identify the node as a leaf node).

Additionally, or alternatively, the detector tree may include one or more attached nodes. An attached node may include a node, included the detector tree, that is a parent of one or more other nodes and that stores information associated with a rule. In some implementations, information associated with the rule being added to the detector tree may be compared to information stored in the attached node (e.g., in order to detect a rule anomaly). Additional details regarding detecting a rule anomaly based on information included in an attached node are described below. In some implementations, the attached node may store a network address associated with the rule, a rule number associated with the rule, an address type of the network address, information identifying a service associated with the rule, information identifying an action to be taken with regard to a packet that matches the rule, information identifying a shadowing anomaly associated with the rule and another rule, information identifying a generalization anomaly associated with the rule and another rule, information identifying a correlation anomaly associated with the rule and another rule, information identifying a correlation anomaly associated with the rule and another rule, and/or another type of information. In some implementations, the bit index value of the attached node may be based on the network address (e.g., associated with the rule) stored by the attached node. For example, the bit index value of the attached node may be equal to a value of a sub-network mask of the network address, stored by the attached node, minus a value of one.

Additionally, or alternatively, the detector tree may include one or more intermediate nodes. An intermediate node may include a node, included the detector tree, that is a parent of one or more other nodes, but does not store information associated with a rule. In some implementations, the intermediate node may be used to navigate the detector tree (e.g., based on a bit index value stored by the intermediate node), as described below. In some implementations, the intermediate node may store a bit index value from 0 to 31.

In some implementations, firewall device 230 may add the rule to the detector tree by adding a node (e.g., one or more leaf nodes, intermediate nodes, and/or attached nodes) to the detector tree that corresponds to a source network address and by adding a node to the detector tree that corresponds to a destination network address associated with the rule. For example, assume that a root node (e.g., a top level node of the detector tree), included in the detector tree, is an intermediate node that stores a bit index value of 4. In this example, firewall device 230 may determine the fifth bit of the source address associated with the rule (e.g., corresponding to the bit index value of 4). Here, if the fifth bit of the source address is 0, then firewall device 230 may proceed to a next node (e.g., a node corresponding to the determination that the fifth bit of the source address is equal to 0). Continuing with this example, assume that the next node is a leaf node that stores another network address associated with another rule. Here, firewall device 230 may compare the source address to the other network address. If the source address differs from the other network address, then firewall device 230 may identify a particular bit at which the source address differs from the other network address, may create an intermediate node that stores a bit index value corresponding to the particular bit, and may add a leaf node that stores information associated with the source address.

Alternatively, if the source address includes the other network address (e.g., if the other network address is included in a sub-network of the source address), then firewall device 230 may create an attached node that stores the rule information associated with the source address, and a leaf node (e.g., a child of the attached node) that stores information associated with a rule corresponding to the other network address. Alternatively, if the other network address includes the source address (e.g., if the source address is included in a sub-network of the other network address), then firewall device 230 may create an attached node that stores information associated with the rule corresponding to the other network address, and a leaf node that stores the rule information associated with the source address. Alternatively, if the other network address is identical to the source address, then firewall device 230 may add the rule information, associated with the source address, to a node that stores information associated with the rule corresponding to the other network address.

In some implementations, firewall device 230 may add a node associated with the destination address to the detector tree, in a similar manner (e.g., after firewall device 230 adds the node associated with the source address to the detector tree, before firewall device 230 adds the node associated with the source address to the detector tree, concurrently with firewall device 230 adding the node associated with the source address to the detector tree).

In some implementations, firewall device 230 may add multiple rules to the detector tree (e.g., by adding nodes corresponding to each rule to the detector tree). For example, firewall device 230 may generate a detector tree associated with the rule information (e.g., when firewall device 230 does not store a detector tree associated with the rule information). As another example, firewall device 230 may add and/or update one or more rules to a detector tree (e.g., when firewall device 230 stores a detector tree associated with the rule information and firewall device 230 receives updated rule information, information associated with an additional rule, etc.)

In some implementations, firewall device 230 may store the detector tree in a memory location (e.g., a RAM, a ROM, a cache, a hard disk, etc.) of firewall device 230. Additionally, or alternatively, firewall device 230 may provide the detector tree to another device for storage. In some implementations, firewall device 230 may store information associated with the detector tree such that a previous detector tree (e.g., generated at an earlier time) is overwritten and/or deleted. Additionally, or alternatively, firewall device 230 may store the detector tree such that firewall device 230 may retrieve the detector tree at a later time.

As further shown in FIG. 4, process 400 may include detecting a rule anomaly based on adding the rule to the detector tree (block 430). For example, firewall device 230 may detect a rule anomaly based on adding the rule to the detector tree. In some implementations, firewall device 230 may detect the rule anomaly when firewall device 230 adds the rule to the detector tree. Additionally, or alternatively, firewall device 230 may detect the rule anomaly when firewall device 230 receives information indicating that firewall device 230 is to detect the rule anomaly.

A rule anomaly may include a conflict between two rules included in a rule set associated with a firewall policy. In some implementations, the rule anomaly may include a shadowing anomaly, a generalization anomaly, a redundancy anomaly, or a correlation anomaly. A shadowing anomaly may occur when a previous rule (e.g., a rule order earlier in a rule order than a current rule) applies to all packets to which the current rule (e.g., a rule later in the rule order than the previous rule) applies, and when an action associated with the previous rule differs from an action associated with the current rule (e.g., such that the current rule will never be executed). A generalization anomaly may occur when a current rule and a previous rule have different actions, and when the current rule applies to all packets to which the previous rule applies. A redundancy anomaly may occur when, with respect to a current rule, there exists a previous rule that performs an identical action with respect to the same packets that would be acted upon by the current rule. A correlation anomaly may occur when a previous rule applies to some packets to which a current rule applies, the current rule applies to some packets to which the previous rule applies, and when an action associated with the previous rule differs from an action associated with the current rule.

In some implementations, firewall device 230 may detect the rule anomaly by comparing a first source address and a first destination address, associated with a first rule, and a second source address and a second destination address associated with a second rule. For example, firewall device 230 may add the rule to the detector tree (e.g., by adding one or more nodes to the detector tree), as described above. In this example, based on the location at which the one or more nodes, associated with the rule, are added to the detector tree, firewall device 230 may identify another rule (e.g., associated with a second source address and a second destination address) to which the rule is to be compared. Firewall device 230 may then compare (1) the first source address to the second source address, (2) the first destination address to the second destination address, (3) a service, associated with the rule, to a service associated with another rule, (4) an action, associated with the rule, to an action, associated with the other rule, and may identify the rule anomaly accordingly. Examples of detecting each type of rule anomaly are described below with regard to example implementation 500. In some implementations, the detector tree data structure may allow firewall device 230 to detect the rule anomaly based on relatively few rule comparisons (e.g., a quantity of comparisons approximately equal to a value of log N) as compared to a quantity of rules (e.g., a quantity of N rules) included in the firewall policy.

As further shown in FIG. 4, process 400 may include identifying the rule anomaly within the detector tree (block 440). For example, firewall device 230 may identify the rule anomaly within the detector tree. In some implementations, firewall device 230 may identify the rule anomaly within the detector tree after firewall device 230 detects the rule anomaly.

In some implementations, firewall device 230 may identify the rule anomaly within the detector tree by including information, associated with the rule anomaly, within a node corresponding to the rule. For example, firewall device 230 may determine that a shadowing anomaly exists between a first rule and a second rule (e.g., when the first rule shadows the second rule). In this example, firewall device 230 may include, in a first node associated with the second rule (e.g., a leaf node that stores a source address associated with the second rule), information (e.g., an s-link) pointing to a first node, associated with the first rule (e.g., a leaf node that stores a source address associated with the first rule), that indicates that the second rule is shadowed by the first rule. Similarly, firewall device 230 may include, in a second node associated with the second rule (e.g., a leaf node that stores a destination address associated with the second rule), information pointing to a second node (e.g., a leaf node that stores a destination address associated with the first rule), associated with the first rule, that indicates that the second rule is shadowed by the first rule.

As another example, firewall device 230 may determine that a correlation anomaly exists between a first rule and a second rule (e.g., when the second rule is correlated to the first rule). In this example, firewall device 230 may include, in a first node associated with the second rule (e.g., a leaf node that stores a source address associated with the second rule), information (e.g., a c-link) pointing to a first node, associated with the first rule (e.g., a leaf node that stores a source address associated with the first rule), that indicates that the second rule is correlated to the first rule. Similarly, firewall device 230 may include, in a second node associated with the second rule (e.g., a leaf node that stores a destination address associated with the second rule), information pointing to a second node, associated with the first rule (e.g., a leaf node that stores a destination address associated with the first rule), that indicates that the second rule is correlated to the first rule.

As yet another example, firewall device 230 may determine that a redundancy anomaly exists between a first rule and a second rule (e.g., when the second rule is redundant to the first rule). In this example, firewall device 230 may include, in a first node associated with the second rule (e.g., a leaf node that stores a source address associated with the second rule), information (e.g., an r-link) pointing to a first node, associated with the first rule (e.g., a leaf node that stores a source address associated with the first rule), that indicates that the second rule is redundant to the first rule. Similarly, firewall device 230 may include, in a second node associated with the second rule (e.g., a leaf node that stores a destination address associated with the second rule), information pointing to a second node, associated with the first rule (e.g., a leaf node that stores a destination address associated with the first rule), that indicates that the second rule is redundant to the first rule.

As still another example, firewall device 230 may determine that a generalization anomaly exists between a first rule and a second rule (e.g., when the second rule is generalized by the first rule). In this example, firewall device 230 may include, in a first node associated with the second rule (e.g., a leaf node that stores a source address associated with the second rule), information (e.g., a g-link) pointing to a first node, associated with the first rule (e.g., a leaf node that stores a source address associated with the first rule), that indicates that the second rule is generalized by the first rule. Similarly, firewall device 230 may include, in a second node associated with the second rule (e.g., a leaf node that stores a destination address associated with the second rule), information pointing to a second node, associated with the first rule (e.g., a leaf node that stores a destination address associated with the first rule), that indicates that the second rule is generalized by the first rule. In this way, firewall device 230 may add firewall intelligence, associated with one or more rule anomalies, to the detector tree.

As further shown in FIG. 4, process 400 may include providing information associated with the rule anomaly (block 450). For example, firewall device 230 may provide information associated with the rule anomaly. In some implementations, firewall device 230 may provide the information associated with the rule anomaly after firewall device 230 identifies the rule anomaly within the detector tree. Additionally, or alternatively, firewall device 230 may provide the information associated with the rule anomaly when firewall device 230 receives information indicating that firewall device 230 is to provide the information associated with the rule anomaly.

In some implementations, firewall device 230 may provide the information associated with the rule anomaly (herein referred to as rule anomaly information) to client device 210. For example, firewall device 230 may provide the rule anomaly information to client device 210 to allow a user of client device 210 to view the rule anomaly information and/or update the rule information (e.g., in order to eliminate the rule anomaly). Additionally, or alternatively, firewall device 230 may provide the rule anomaly information for storage (e.g., such that firewall device 230 may provide the rule anomaly information at a later time).

In some implementations, firewall device 230 may provide rule anomaly information associated with multiple rule anomalies (e.g., when firewall device 230 provides rule anomaly information associated with multiple rule anomalies associated with a set of rules). Additionally, or alternatively, firewall device 230 may provide the rule anomaly information based on a request provided by client device 210. For example, the user of client device 210 may request (e.g., via client device 210) rule anomaly information associated a set of rules, a particular rule, a particular type of rule anomaly, or the like, and firewall device 230 may provide the rule anomaly information accordingly.

In some implementations, firewall device 230 may resolve the rule anomaly (e.g., automatically). For example, in some implementations, firewall device 230 may resolve the rule anomaly by automatically deleting (e.g., from the detector tree) a rule associated with the rule anomaly. In this example, firewall device 230 may delete a rule that is later in the rule order (e.g., when a first rule in a rule order shadows a fifth rule in the rule order, firewall device 230 may delete the fifth rule from the detector tree). As another example, firewall device 230 may delete a narrowest rule associated with the rule anomaly (e.g., firewall device 230 may delete a rule, associated with the rule anomaly, that covers a smallest range of network addresses). Additionally, or alternatively, firewall device 230 may resolve the rule anomaly by modifying (e.g., automatically) a rule associated with the rule anomaly. For example, firewall device 230 may modify a source address, a destination address, a service, and/or an action, associated with a rule that causes the rule anomaly, in order to resolve the rule anomaly. In some implementations, firewall device 230 may resolve the rule anomaly, and may provide information associated with resolving the rule anomaly to client device 210 (e.g., to allow the user to approve the resolution of the rule anomaly, to allow the user to modify the resolution of the rule anomaly, etc.).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5J are diagrams of an example implementation 500 relating to example process 400 shown in FIG. 4. For the purpose of example implementation 500, assume that a user has provided, to client device 210, rule information associated with a set of rules (e.g., rule 1 through rule 8) included in a firewall policy. Further, assume that firewall device 230 is configured to generate a detector tree based on the rule information, and provide information associated with any rule anomalies that exist within the firewall policy.

Figure 5A:
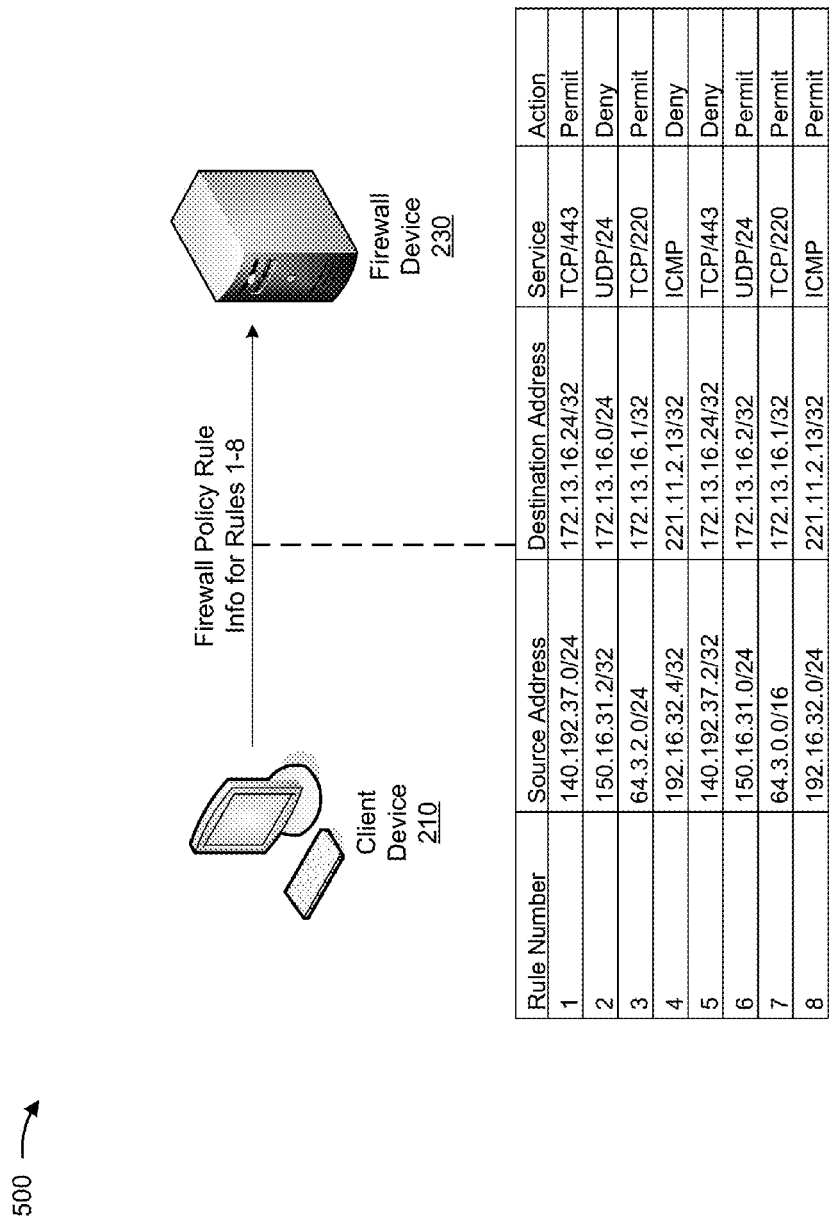
FIGS. 5A-5J are diagrams of an example implementation relating to the example process shown in FIG. 4.

As shown in FIG. 5A, client device 210 may provide the rule information to firewall device 230. As shown, the rule information may include information associated with the set of rules, and each rule may be described by a rule number, a source address, a destination address, a service, and an action.

Figure 5B:
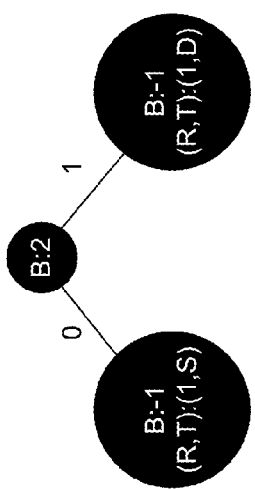

As shown in FIG. 5B, firewall device 230 may add rule 1 to the detector tree (e.g., firewall device 230 may begin constructing a detector tree based on rule 1). As shown, firewall device 230 may compare a rule 1 source address (e.g., 140.192.37.0/24) to a rule 1 destination address (e.g., 172.13.16.24/32), and may determine that the rule 1 source address first differs from the rule 1 destination address at the third bit (e.g., since 140 decimal is equal to 10001100 binary and since 172 decimal is equal to 10101100 binary). As shown, firewall device 230 may add rule 1 to the detector tree by (1) creating an intermediate node with a bit index value of 2 (e.g., since the rule 1 source address differs from the rule 1 destination address in the third bit), (2) connecting the intermediate node to a leaf node (e.g., via a left path) that stores the rule 1 source address, a rule number associated with rule 1 (e.g., 1), an address type associated with the rule 1 source address (e.g., S), a service associated with rule 1, and an action associated with rule 1, and (3) connecting the intermediate node (e.g., via a right path) to a leaf node that stores the rule 1 destination address, a rule number associated with rule 1 (e.g., 1), an address type associated with the rule 1 destination address (e.g., D), a service associated with rule 1, and an action associated with rule 1. For the purposes of example implementation 500, assume that a left branch, connecting a first node to a second node, corresponds to a bit value (e.g., associated with a network address) of 0, and that a right branch, connecting the first node to a third node, corresponds to a bit value of 1.

Figure 5C:
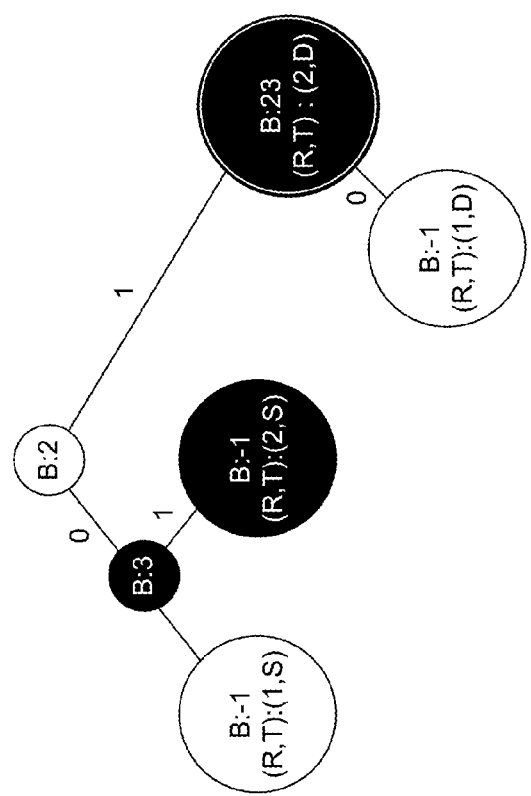

As shown in FIG. 5C, firewall device 230 may add rule 2 to the detector tree. With respect to a rule 2 source address (e.g., 150.16.31.2/32), firewall device 230 may start at the root node (e.g., the intermediate node that stores the bit value of 2), and may determine that a third bit is equal to 0 (e.g., since 150 decimal is equal to 10010110 binary), and firewall device 230 may navigate down the left branch of the detector tree (e.g., corresponding to the third bit being equal to 0). Since the next node in the path is the rule 1 source address leaf node, firewall device 230 may compare the rule 2 source address to the rule 1 source address, and may determine that the rule 2 source address first differs from the rule 1 source address at the fourth bit (e.g., since 150 decimal is equal to 10010110 binary and since 140 decimal is equal to 10001100 binary). As shown, firewall device 230 may add a leaf node, corresponding to the rule 2 source address by (1) creating a new intermediate node with a bit index value of 3 (e.g., since the rule 2 source address differs from the rule 1 source address at the fourth bit), and (2) adding a leaf node (e.g., on a right branch leading from the new intermediate node) that stores the rule 2 source address, a rule number associated with rule 2 (e.g., 2), an address type associated with the rule 2 source address (e.g., S), a service associated with rule 2, and an action associated with rule 2.

As further shown in FIG. 5C, with respect to a rule 2 destination address (e.g., 172.13.16.0/24), firewall device 230 may determine (e.g., based on starting at the root node) that a third bit is equal to 1 (e.g., since 172 decimal is equal to 10101100 binary), and firewall device 230 may navigate down the right branch of the detector tree (e.g., corresponding to the third bit being equal to 1). Since the next node is the rule 1 destination address leaf node, firewall device 230 may compare the rule 2 destination address to the rule 1 destination address, and may determine that the rule 2 destination address includes the rule 1 destination address (e.g., since 172.13.16.0/24 includes 172.13.16.27/32). As shown, firewall device 230 may add an attached node, corresponding to the rule 2 destination address, with a bit index value of 23 (e.g., since a value of a sub-network mask of the rule 2 destination address minus one is equal to 23), that stores the rule 2 destination address, a rule number associated with rule 2 (e.g., 2), an address type associated with the rule 2 destination address (e.g., D), a service associated with rule 2, and an action associated with rule 2.

As shown, the rule 1 destination address leaf node may be connected via a left branch of the rule 2 attached node (e.g., since a twenty-fourth bit of the rule 1 destination address is equal to 0). Here, firewall device 230 need not compare rule 2 to rule 1 since the rule 2 source address does not include the rule 1 source address, the rule 1 source address does not include the rule 2 source address, and the rule 2 source address is not identical to the rule 1 source address (e.g., thus, no rule anomaly exists between rule 1 and rule 2).

Figure 5D:
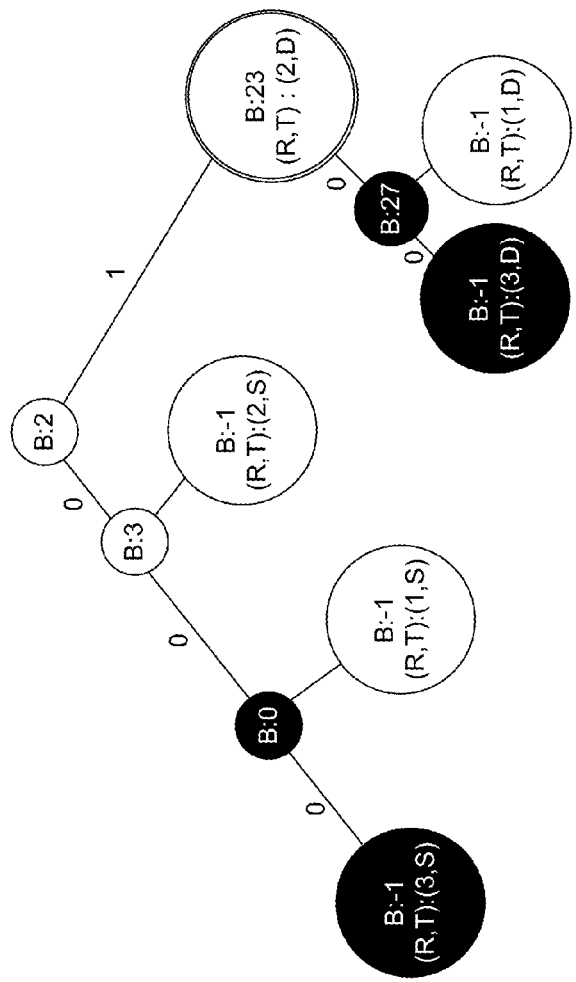

As shown in FIG. 5D, firewall device 230 may add rule 3 to the detector tree. With respect to a rule 3 source address (e.g., 64.3.2.0/24), firewall device 230 may determine (e.g., based on starting at the root node that stores the bit index value of 2) that a third bit is equal to 0 (e.g., since 64 decimal is equal to 01000000 binary), and firewall device 230 may navigate down the left branch of the detector tree to the intermediate node that stores the bit index value of 3. Firewall device 230 may then determine that a fourth bit is equal to 0 (e.g., since 64 decimal is equal to 01000000 binary), and firewall device 230 may navigate down a left branch associated with the intermediate node that stores the bit index value of 3 (e.g., corresponding to the fourth bit being equal to 0). Since the next node in the path is the rule 1 source address leaf node, firewall device 230 may compare the rule 3 source address to the rule 1 source address, and may determine that the rule 3 source address first differs from the rule 1 source address at the first bit (e.g., since 64 decimal is equal to 01000000 binary and since 140 decimal is equal to 10001100 binary). As shown, firewall device 230 may add a leaf node, corresponding to the rule 3 source address by (1) creating a new intermediate node with a bit index value of 0 (e.g., since the rule 3 source address differs from the rule 1 source address at the first bit), and (2) adding a leaf node (e.g., on a left branch leading from the new intermediate node) that stores the rule 3 source address, a rule number associated with rule 3 (e.g., 3), an address type associated with the rule 3 source address (e.g., S), a service associated with rule 3, and an action associated with rule 3.

As further shown in FIG. 5D, with respect to a rule 3 destination address (e.g., 172.13.16.1/32), firewall device 230 may determine that a third bit is equal to 1 (e.g., since 172 decimal is equal to 10101100 binary), and firewall device 230 may navigate down the right branch of the detector tree (e.g., corresponding to the third bit being equal to 1). Since the next node is the rule 2 destination address attached node, firewall device 230 may compare the rule 3 destination address to the rule 2 destination address, and may determine that the rule 2 destination address includes the rule 3 destination address (e.g., since 172.13.16.0/24 includes 172.13.16.1/32). As shown, firewall device 230 may then determine that a twenty-fourth bit of the rule 3 destination address is equal to 0, and firewall device 230 may navigate down a left branch associated with the attached node (e.g., corresponding to the twenty-fourth bit being equal to 0). Since the next node in the path is the rule 1 destination address leaf node, firewall device 230 may compare the rule 3 destination address to the rule 1 destination address, and may determine that the rule 3 destination address first differs from the rule 1 destination address at the twenty-eighth bit (e.g., since 1 decimal is equal to 00000001 binary and since 24 decimal is equal to 00011000 binary). As shown, firewall device 230 may add a leaf node, corresponding to the rule 3 destination address by (1) creating a new intermediate node with a bit index value of 27 (e.g., since the rule 3 destination address differs from the rule 1 destination address at the twenty-eighth bit), and (2) adding a leaf node (e.g., on a left branch leading from the new intermediate node) that stores the rule 3 destination address, a rule number associated with rule 3 (e.g., 3), an address type associated with the rule 3 destination address (e.g., D), a service associated with rule 3, and an action associated with rule 3. Here, firewall device 230 need not compare rule 3 to rule 1, since the rule 3 source address does not include the rule 1 source address, the rule 1 source address does not include the rule 3 source address, and the rule 3 source address is not identical to the rule 1 source address (e.g., thus, no rule anomaly exists between rule 3 and rule 1). Similarly, firewall device 230 need not compare rule 3 to rule 2, since the rule 3 source address does not include the rule 2 source address, the rule 2 source address does not include the rule 3 source address, and the rule 3 source address is not identical to the rule 2 source address (e.g., thus, no rule anomaly exists between rule 3 and rule 2)

Figure 5E:
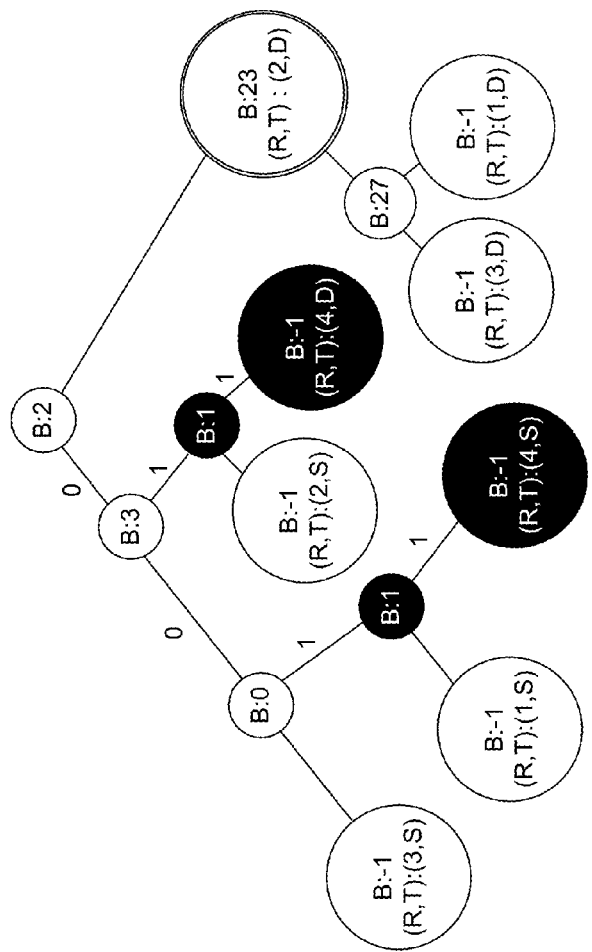

As shown in FIG. 5E, firewall device 230 may add rule 4 to the detector tree. With respect to a rule 4 source address (e.g., 192.16.32.4/32), firewall device 230 may determine (e.g., based on starting at the root node that stores the bit index value of 2) that a third bit is equal to 0 (e.g., since 192 decimal is equal to 11000000 binary), and firewall device 230 may navigate down the left branch to the intermediate node that stores the bit index value of 3. Firewall device 230 may then determine that a fourth bit is equal to 0 (e.g., since 192 decimal is equal to 11000000 binary), and firewall device 230 may navigate down a left branch (e.g., corresponding to the fourth bit being equal to 0) to the intermediate node that stores the bit index value of 0. Firewall device 230 may then determine that a first bit is equal to 1 (e.g., since 192 decimal is equal to 11000000 binary), and firewall device 230 may navigate down a right branch associated with the intermediate node that stores the bit index value of 0 (e.g., corresponding to the first bit being equal to 0). Since the next node in the path is the rule 1 source address leaf node, firewall device 230 may compare the rule 4 source address to the rule 1 source address, and may determine that the rule 4 source address first differs from the rule 1 source address at the second bit (e.g., since 192 decimal is equal to 11000000 binary and since 140 decimal is equal to 10001100 binary). As shown, firewall device 230 may add a leaf node, corresponding to the rule 4 source address by (1) creating a new intermediate node with a bit index value of 1 (e.g., since the rule 4 source address differs from the rule 1 source address at the second bit), and (2) adding a leaf node (e.g., on a right branch leading from the new intermediate node) that stores the rule 4 source address, a rule number associated with rule 4 (e.g., 4), an address type associated with the rule 4 source address (e.g., S), a service associated with rule 4, and an action associated with rule 4.

As further shown in FIG. 5E, with respect to a rule 4 destination address (e.g., 221.11.2.13/32), firewall device 230 may determine (e.g., based on starting at the root node that stores the bit index value of 2) that a third bit is equal to 0 (e.g., since 221 decimal is equal to 11011101 binary), and firewall device 230 may navigate down the left branch to the intermediate node that stores the bit index value of 3. Firewall device 230 may then determine that a fourth bit is equal to 1 (e.g., since 221 decimal is equal to 11011101 binary), and firewall device 230 may navigate down a right branch (e.g., corresponding to the fourth bit being equal to 1). Since the next node in the path is the rule 2 source address leaf node, firewall device 230 may compare the rule 4 destination address to the rule 2 source address, and may determine that the rule 4 destination address first differs from the rule 2 source address at the second bit (e.g., since 221 decimal is equal to 11011101 binary and since 172 decimal is equal to 10101100 binary). As shown, firewall device 230 may add a leaf node, corresponding to the rule 4 destination address, by (1) creating a new intermediate node with a bit index value of 1 (e.g., since the rule 4 destination address differs from the rule 2 source address at the second bit), and (2) adding a leaf node (e.g., on a right branch leading from the new intermediate node) that stores the rule 4 destination address, a rule number associated with rule 4 (e.g., 4), an address type associated with the rule 4 destination address (e.g., D), a service associated with rule 4, and an action associated with rule 4. Here, firewall device 230 need not compare rule 4 to rule 1, rule 2, or rule 3, since the rule 4 source address and the rule 4 destination address are not included by any other source address or destination address included in the detector tree.

Figure 5F:
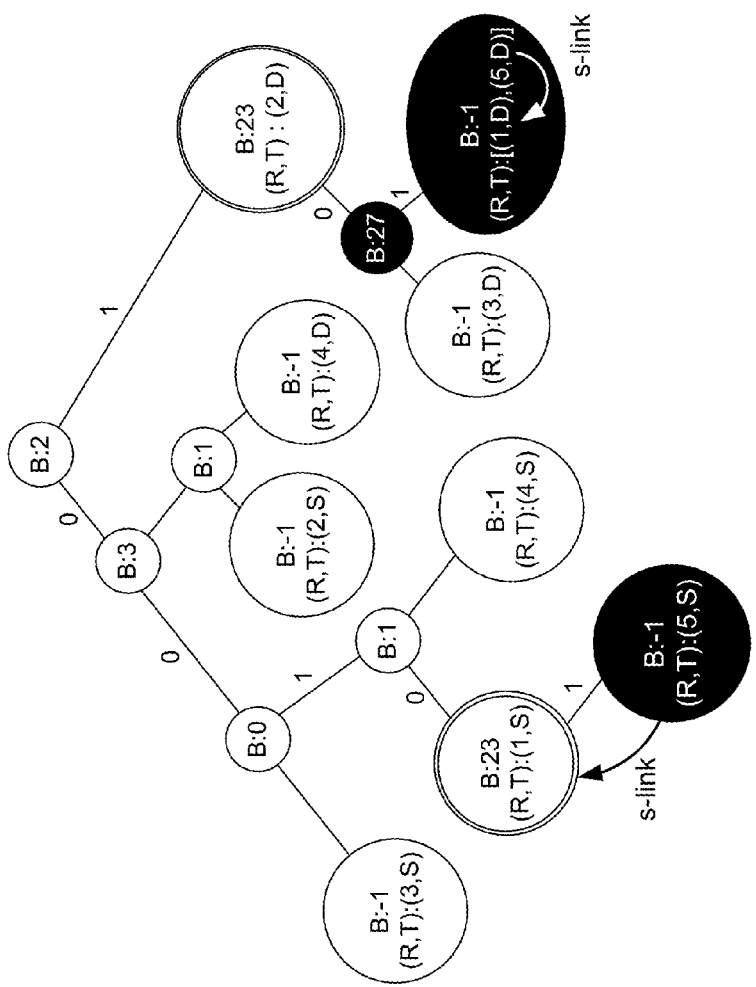

As shown in FIG. 5F, firewall device 230 may add rule 5 to the detector tree. With respect to a rule 5 source address (e.g., 140.192.37.2/32), firewall device 230 may determine (e.g., based on starting at the root node that stores the bit index value of 2) that a third bit is equal to 0 (e.g., since 140 decimal is equal to 10001100 binary), and firewall device 230 may navigate down the left branch to the intermediate node that stores the bit index value of 3. Firewall device 230 may then determine that a fourth bit is equal to 0 (e.g., since 140 decimal is equal to 10001100 binary), and firewall device 230 may navigate down a left branch (e.g., corresponding to the fourth bit being equal to 0) to the intermediate node that stores the bit index value of 0. Firewall device 230 may then determine that a first bit is equal to 1 (e.g., since 140 decimal is equal to 10001100 binary), and firewall device 230 may navigate down to a right branch (e.g., corresponding to the first bit being equal to 1) to the intermediate node that stores the bit index value of 1. Firewall device 230 may then determine that a second bit is equal to 0 (e.g., since 140 decimal is equal to 10001100 binary), and firewall device 230 may navigate down a left branch associated with the intermediate node that stores the bit index value of 1 (e.g., corresponding to the second bit being equal to 0). Since the next node in the path is the rule 1 source address leaf node, firewall device 230 may compare the rule 5 source address to the rule 1 source address, and may determine that the rule 1 source address includes the rule 5 source address (e.g., since 140.192.37.0/24 includes 140.192.37.2/32). As shown, firewall device 230 may convert the rule 1 source address leaf node to a rule 1 source address attached node with a bit index value of 23 (e.g., since a value of a sub-network mask of the rule 1 source address minus one is equal to 23). As shown, firewall device 230 may also add (e.g., on a right branch leading from the new intermediate node) a rule 5 source address leaf node that stores the rule 5 source address, a rule number associated with rule 5 (e.g., 5), an address type associated with the rule 5 source address (e.g., S), a service associated with rule 5, and an action associated with rule 5.

As further shown in FIG. 5F, with respect to a rule 5 destination address (e.g., 172.13.16.24/32), firewall device 230 may determine that a third bit is equal to 1 (e.g., since 172 decimal is equal to 10101100 binary), and firewall device 230 may navigate down the right branch of the detector tree (e.g., corresponding to the third bit being equal to 1). Since the next node is the rule 2 destination address attached node, firewall device 230 may compare the rule 5 destination address to the rule 2 destination address, and may determine that the rule 2 destination address includes the rule 5 destination address (e.g., since 172.13.16.0/24 includes 172.13.16.24/32). As shown, firewall device 230 may then determine that a twenty-fourth bit of the rule 5 destination address is equal to 0, and firewall device 230 may navigate down a left branch associated with the attached node (e.g., corresponding to the twenty-fourth bit being equal to 0) to the intermediate node that stores the bit index value of 27. Firewall device 230 may then determine that a twenty-eighth bit is equal to 1 (e.g., since 24 decimal is equal to 00011000 binary), and firewall device 230 may navigate down a right branch associated with the intermediate node that stores the bit index value of 27. Since the next node in the path is the rule 1 destination address leaf node, firewall device 230 may compare the rule 5 destination address to the rule 1 destination address, and may determine that the rule 5 destination address is identical to the rule 1 destination address. As shown, firewall device 230 may add, to the rule 1 destination address leaf node, the rule 5 destination address, a rule number associated with rule 5 (e.g., 5), an address type associated with the rule 5 destination address (e.g., D), a service associated with rule 5, and an action associated with rule 5.

Based on the addition of the rule 5 source address leaf node as a child of the rule 1 source address attached node, and the rule 5 destination address being incorporated into the rule 1 destination address leaf node, firewall device 230 may compare rule 5 and rule 1 in order to determine whether a rule anomaly exists. As shown, firewall device 230 may determine that rule 1 shadows rule 5 since the rule 1 source address includes the rule 5 source address, the rule 1 destination address is identical to the rule 5 destination address, a rule 1 service (e.g., TCP/443) matches a rule 5 service (e.g., TCP/443), and a rule 1 action (e.g., permit) differs from a rule 5 action (e.g., deny). As further shown, firewall device 230 may identify the shadowing anomaly within the detector tree (e.g., by including an s-link) between rule 5 and rule 1. Notably, due to the organization of the detector tree, rule 5 needs to be compared only to rule 1 in order to determine whether a rule anomaly exists.

Figure 5G:
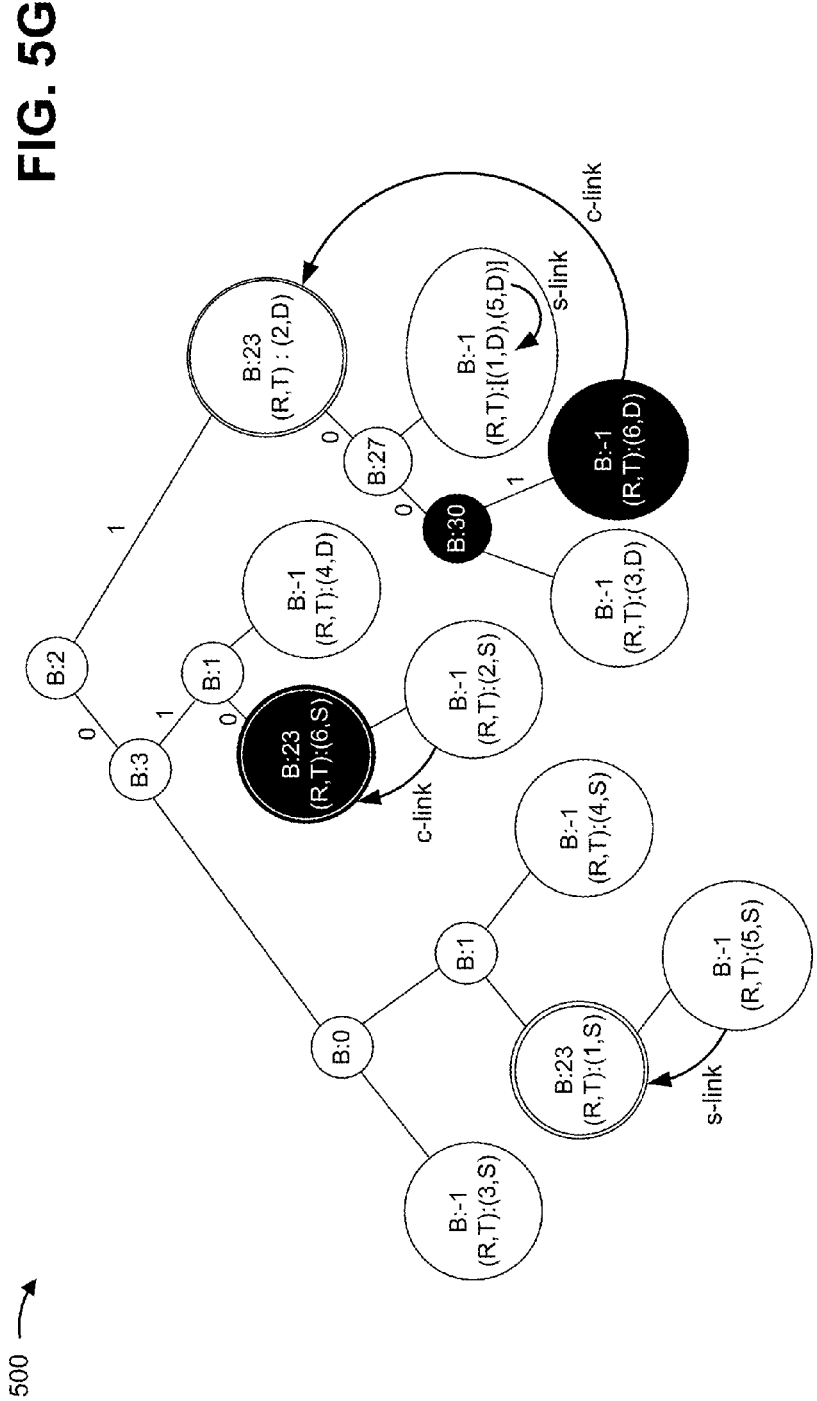

As shown in FIG. 5G, firewall device 230 may add rule 6 to the detector tree. With respect to a rule 6 source address (e.g., 150.16.31.0/24), firewall device 230 may determine (e.g., based on starting at the root node that stores the bit index value of 2) that a third bit is equal to 0 (e.g., since 150 decimal is equal to 10010110 binary), and firewall device 230 may navigate down the left branch to the intermediate node that stores the bit index value of 3. Firewall device 230 may then determine that a fourth bit is equal to 1 (e.g., since 150 decimal is equal to 10010110 binary), and firewall device 230 may navigate down a right branch (e.g., corresponding to the fourth bit being equal to 1) to the intermediate node that stores the bit index value of 1. Firewall device 230 may then determine that a second bit is equal to 0 (e.g., since 150 decimal is equal to 10010110 binary), and firewall device 230 may navigate down to a left branch (e.g., corresponding to the first bit being equal to 0). Since the next node in the path is the rule 2 source address leaf node, firewall device 230 may compare the rule 6 source address to the rule 2 source address, and may determine that the rule 6 source address includes the rule 2 source address (e.g., since 150.16.31.0/24 includes 150.16.31.2/32). As shown, firewall device 230 may add an attached node, corresponding to the rule 6 source address, with a bit index value of 23 (e.g., since a value of a sub-network mask of the rule 6 source address minus one is equal to 23), that stores the rule 6 source address, a rule number associated with rule 6 (e.g., 6), an address type associated with the rule 6 source address (e.g., S), a service associated with rule 6, and an action associated with rule 6. As shown, the rule 2 source address leaf node may be connected via a right branch of the rule 6 attached node (e.g., since a twenty-fourth bit of the rule 2 source address is equal to 1).

As further shown in FIG. 5G, with respect to a rule 6 destination address (e.g., 172.13.16.2/32), firewall device 230 may determine that a third bit is equal to 1 (e.g., since 172 decimal is equal to 10101100 binary), and firewall device 230 may navigate down the right branch of the detector tree (e.g., corresponding to the third bit being equal to 1). Since the next node is the rule 2 destination address attached node, firewall device 230 may compare the rule 6 destination address to the rule 2 destination address, and may determine that the rule 2 destination address includes the rule 6 destination address (e.g., since 172.13.16.0/24 includes 172.13.16.2/32). As shown, firewall device 230 may then determine that a twenty-fourth bit of the rule 3 destination address is equal to 0, and firewall device 230 may navigate down a left branch associated with the attached node (e.g., corresponding to the twenty-fourth bit being equal to 0) to the intermediate node that stores the bit index value equal to 27. Firewall device 230 may then determine that a twenty-eighth bit is equal to 0 (e.g., since 2 decimal is equal to 00000010 binary), and firewall device 230 may navigate down to a left branch (e.g., corresponding to the twenty-eighth bit being equal to 0). Since the next node in the path is the rule 3 destination address leaf node, firewall device 230 may compare the rule 6 destination address to the rule 3 destination address, and may determine that the rule 6 destination address first differs from the rule 3 destination address at the thirty-first bit (e.g., since 2 decimal is equal to 00000010 binary and since 1 decimal is equal to 00000001 binary). As shown, firewall device 230 may add a leaf node, corresponding to the rule 6 destination address by (1) creating a new intermediate node with a bit index value of 30 (e.g., since the rule 6 destination address differs from the rule 3 destination address at the thirty-first bit), and adding a leaf node (e.g., on a right branch leading from the new intermediate node) that stores the rule 6 destination address, a rule number associated with rule 6 (e.g., 6), an address type associated with the rule 6 destination address (e.g., D), a service associated with rule 6, and an action associated with rule 6.

Based on the addition of the rule 6 destination address attached node as a parent of the rule 2 source address leaf node, and the addition of the rule 6 destination address leaf node as a child of the rule 2 destination address attached node, firewall device 230 may compare rule 6 and rule 2 in order to determine whether a rule anomaly exists. As shown, firewall device 230 may determine that rule 2 is correlated to rule 6 since the rule 6 source address includes the rule 2 source address, the rule 2 destination address includes the rule 6 destination address, a rule 2 service (e.g., UDP/24) matches a rule 6 service (e.g., UDP/24), and a rule 2 action (e.g., deny) differs from a rule 6 action (e.g., permit). As further shown, firewall device 230 may identify the correlation anomaly within the detector tree (e.g., by including a c-link) between the nodes associated with rule 2 and rule 6. Notably, due to the organization of the detector tree, rule 6 needs to be compared only to rule 2 in order to determine whether a rule anomaly exists.

Figure 5H:
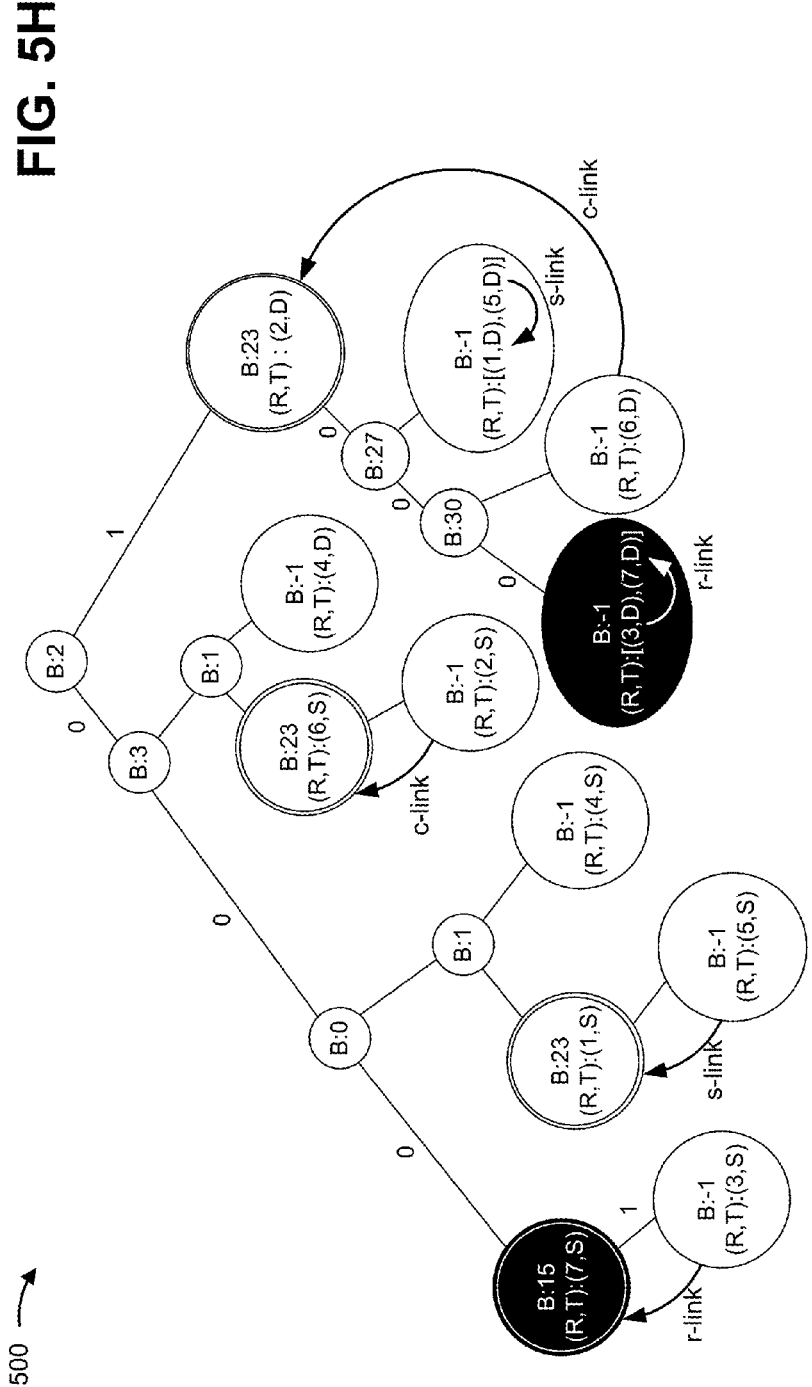

As shown in FIG. 5H, firewall device 230 may add rule 7 to the detector tree. With respect to a rule 7 source address (e.g., 64.3.0.0/16), firewall device 230 may determine (e.g., based on starting at the root node that stores the bit index value of 2) that a third bit is equal to 0 (e.g., since 64 decimal is equal to 01000000 binary), and firewall device 230 may navigate down the left branch to the intermediate node that stores the bit index value of 3. Firewall device 230 may then determine that a fourth bit is equal to 0 (e.g., since 64 decimal is equal to 01000000 binary), and firewall device 230 may navigate down a left branch (e.g., corresponding to the fourth bit being equal to 0) to the intermediate node that stores the bit index value of 0. Firewall device 230 may then determine that a first bit is equal to 0 (e.g., since 64 decimal is equal to 01000000 binary), and firewall device 230 may navigate down to a left branch (e.g., corresponding to the first bit being equal to 0). Since the next node in the path is the rule 3 source address leaf node, firewall device 230 may compare the rule 7 source address to the rule 3 source address, and may determine that the rule 7 source address includes the rule 3 source address (e.g., since 64.3.0.0/16 includes 64.3.2.0/24). As shown, firewall device 230 may add an attached node, corresponding to the rule 7 source address, with a bit index value of 15 (e.g., since a value of a sub-network mask of the rule 7 source address minus one is equal to 15), that stores the rule 7 source address, a rule number associated with rule 7 (e.g., 7), an address type associated with the rule 7 source address (e.g., S), a service associated with rule 7, and an action associated with rule 7. As shown, the rule 3 source address leaf node may be connected via a right branch of the rule 7 source address attached node (e.g., since a sixteenth bit of the rule 3 source address is equal to 1).

As further shown in FIG. 5H, with respect to a rule 7 destination address (e.g., 172.13.16.1/32), firewall device 230 may determine that a third bit is equal to 1 (e.g., since 172 decimal is equal to 10101100 binary), and firewall device 230 may navigate down the right branch of the detector tree (e.g., corresponding to the third bit being equal to 1). Since the next node is the rule 2 destination address attached node, firewall device 230 may compare the rule 7 destination address to the rule 2 destination address, and may determine that the rule 2 destination address includes the rule 7 destination address (e.g., since 172.13.16.0/24 includes 172.13.16.1/32). As shown, firewall device 230 may then determine that a twenty-fourth bit of the rule 7 destination address is equal to 0, and firewall device 230 may navigate down a left branch associated with the attached node (e.g., corresponding to the twenty-fourth bit being equal to 0) to the intermediate node that stores the bit index value of 27. Firewall device 230 may then determine that a twenty-eighth bit is equal to 0 (e.g., since 1 decimal is equal to 00000001 binary), and firewall device 230 may navigate down a left branch to the intermediate node that stores the bit index value of 30. Firewall device 230 may then determine that a thirty-first bit is equal to 0 (e.g., since 1 decimal is equal to 00000001 binary), and firewall device 230 may navigate down a left branch associated with the intermediate node that stores the bit index value of 30. Since the next node in the path is the rule 3 destination address leaf node, firewall device 230 may compare the rule 7 destination address to the rule 3 destination address, and may determine that the rule 7 destination address is identical to the rule 3 destination address. As shown, firewall device 230 may add, to the rule 7 destination address leaf node, the rule 7 destination address, a rule number associated with rule 7 (e.g., 7), an address type associated with the rule 7 destination address (e.g., D), a service associated with rule 7, and an action associated with rule 7.

Based on the addition of the rule 7 source address attached node as a parent of the rule 3 source address leaf node, and the rule 7 destination address being incorporated into the rule 3 destination address leaf node, firewall device 230 may compare rule 7 and rule 3 in order to determine whether a rule anomaly exists. As shown, firewall device 230 may determine that rule 3 is redundant to rule 7 since the rule 7 source address includes the rule 3 source address, the rule 7 destination address is identical to the rule 3 destination address, a rule 3 service (e.g., TCP/220) matches a rule 7 service (e.g., TCP/220), and a rule 3 action (e.g., permit) is identical to a rule 7 action (e.g., permit). As further shown, firewall device 230 may identify the redundancy anomaly within the detector tree (e.g., by including a r-link) between the nodes associated with rule 3 and rule 7. Notably, due to the organization of the detector tree, rule 7 needs to be compared only to rule 3 in order to determine whether a rule anomaly exists.

Figure 5I:
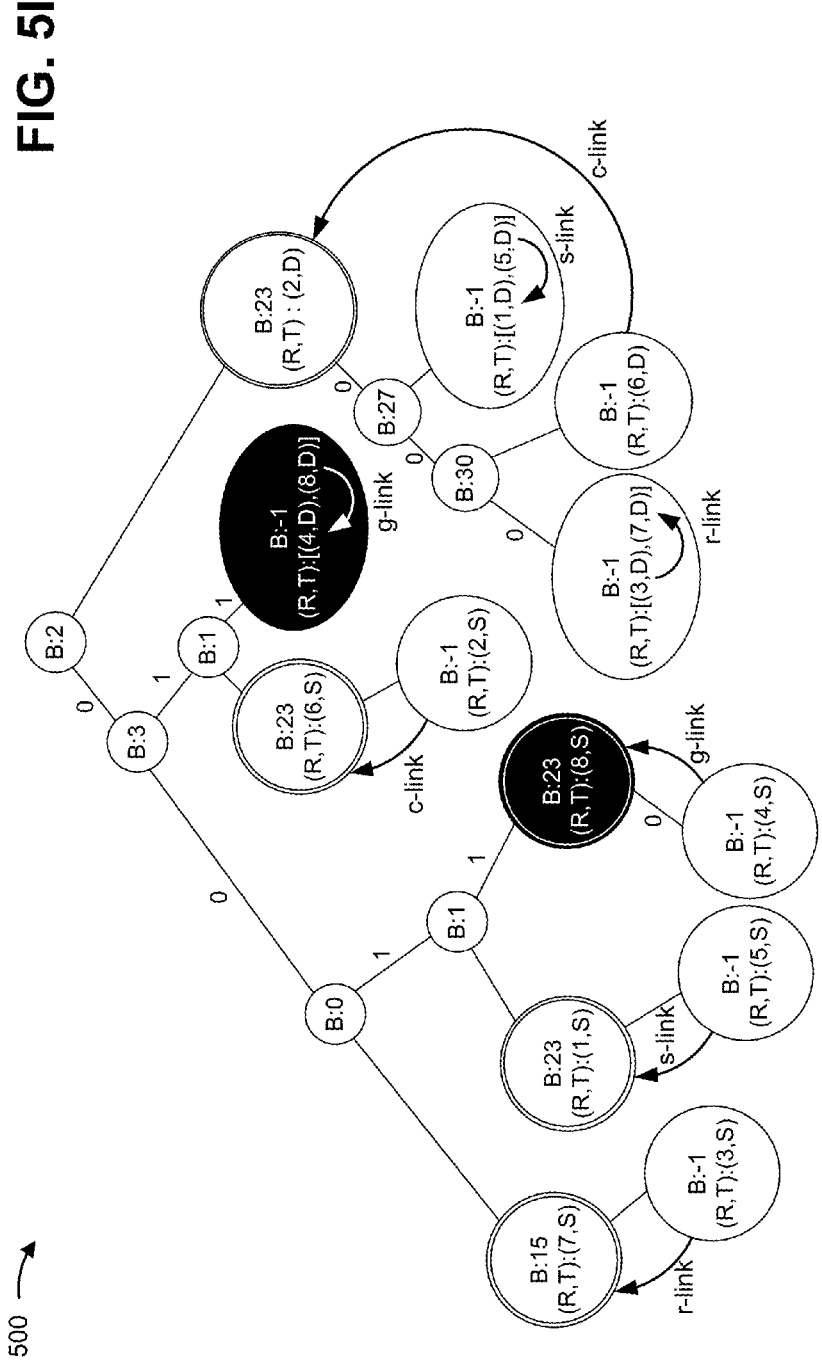

As shown in FIG. 5I, firewall device 230 may add rule 8 to the detector tree. With respect to a rule 8 source address (e.g., 192.16.32.0/24), firewall device 230 may determine (e.g., based on starting at the root node that stores the bit index value of 2) that a third bit is equal to 0 (e.g., since 192 decimal is equal to 11000000 binary), and firewall device 230 may navigate down the left branch to the intermediate node that stores the bit index value of 3. Firewall device 230 may then determine that a fourth bit is equal to 0 (e.g., since 192 decimal is equal to 11000000 binary), and firewall device 230 may navigate down a left branch (e.g., corresponding to the fourth bit being equal to 0) to the intermediate node that stores the bit index value of 0. Firewall device 230 may then determine that a first bit is equal to 1 (e.g., since 192 decimal is equal to 11000000 binary), and firewall device 230 may navigate down to a right branch (e.g., corresponding to the first bit being equal to 1) to the intermediate node that stores the bit index value of 1. Firewall device 230 may then determine that a second bit is equal to 1 (e.g., since 192 decimal is equal to 11000000 binary), and firewall device 230 may navigate down a right branch (e.g., corresponding to the first bit being equal to 1). Since the next node in the path is the rule 4 source address leaf node, firewall device 230 may compare the rule 8 source address to the rule 4 source address, and may determine that the rule 8 source address includes the rule 4 source address (e.g., since 192.16.32.0/24 includes 192.16.32.4/32). As shown, firewall device 230 may add an attached node, corresponding to the rule 8 source address, with a bit index value of 23 (e.g., since a value of a sub-network mask of the rule 8 source address minus one is equal to 23), that stores the rule 8 source address, a rule number associated with rule 8 (e.g., 8), an address type associated with the rule 8 source address (e.g., S), a service associated with rule 8, and an action associated with rule 8. As shown, the rule 4 source address leaf node may be connected via a left branch of the rule 8 source address attached node (e.g., since a twenty-fourth bit of the rule 4 source address is equal to 0).

As further shown in FIG. 5I, with respect to a rule 8 destination address (e.g., 221.11.2.13/32), firewall device 230 may determine (e.g., based on starting at the root node that stores the bit index value of 2) that a third bit is equal to 0 (e.g., since 221 decimal is equal to 11011101 binary), and firewall device 230 may navigate down the left branch to the intermediate node that stores the bit index value of 3. Firewall device 230 may then determine that a fourth bit is equal to 1 (e.g., since 221 decimal is equal to 11011101 binary), and firewall device 230 may navigate down a right branch (e.g., corresponding to the fourth bit being equal to 1) to the intermediate node that stores the bit index value of 1. Firewall device 230 may then determine that a second bit is equal to 1 (e.g., since 221 decimal is equal to 11011101 binary), and firewall device 230 may navigate down to a right branch (e.g., corresponding to the first bit being equal to 1). Since the next node in the path is the rule 4 destination address leaf node, firewall device 230 may compare the rule 8 destination address to the rule 4 destination address, and may determine that the rule 8 destination address is identical to the rule 4 destination address. As shown, firewall device 230 may add, to the rule 4 destination address leaf node, the rule 8 destination address, a rule number associated with rule 8 (e.g., 8), an address type associated with the rule 8 destination address (e.g., D), a service associated with rule 8, and an action associated with rule 8.

Based on the addition of the rule 8 source address attached node as a parent of the rule 4 source address attached node, and the rule 8 destination address being incorporated into the rule 4 destination address leaf node, firewall device 230 may compare rule 8 and rule 4 in order to determine whether a rule anomaly exists. As shown, firewall device 230 may determine that rule 4 is generalized by rule 8 since the rule 8 source address includes the rule 4 source address, the rule 8 destination address is identical to the rule 4 destination address, a rule 4 service (e.g., ICMP) matches a rule 8 service (e.g., ICMP), and since a rule 4 action (e.g., deny) differs from a rule 8 action (e.g., permit). As further shown, firewall device 230 may identify the generalization anomaly within the detector tree (e.g., by including an g-link) between the nodes associated with rule 4 and rule 8. Notably, due to the organization of the detector tree, rule 8 needs to be compared only to rule 4 in order to determine whether a rule anomaly exists.

As shown in the above example, firewall device 230 may detect a rule anomaly with relatively few comparisons as compared to the number of rules in a rule set. For example, as shown above, rule 5 was compared to only rule 1, rule 6 was compared to only rule 2, rule 7 was compared to only rule 3, and rule 8 was compared to only rule 4, in order to detect rule anomalies included in the rule set (e.g., rather than comparing each of the eight rules to each of the other rules).

Figure 5J:
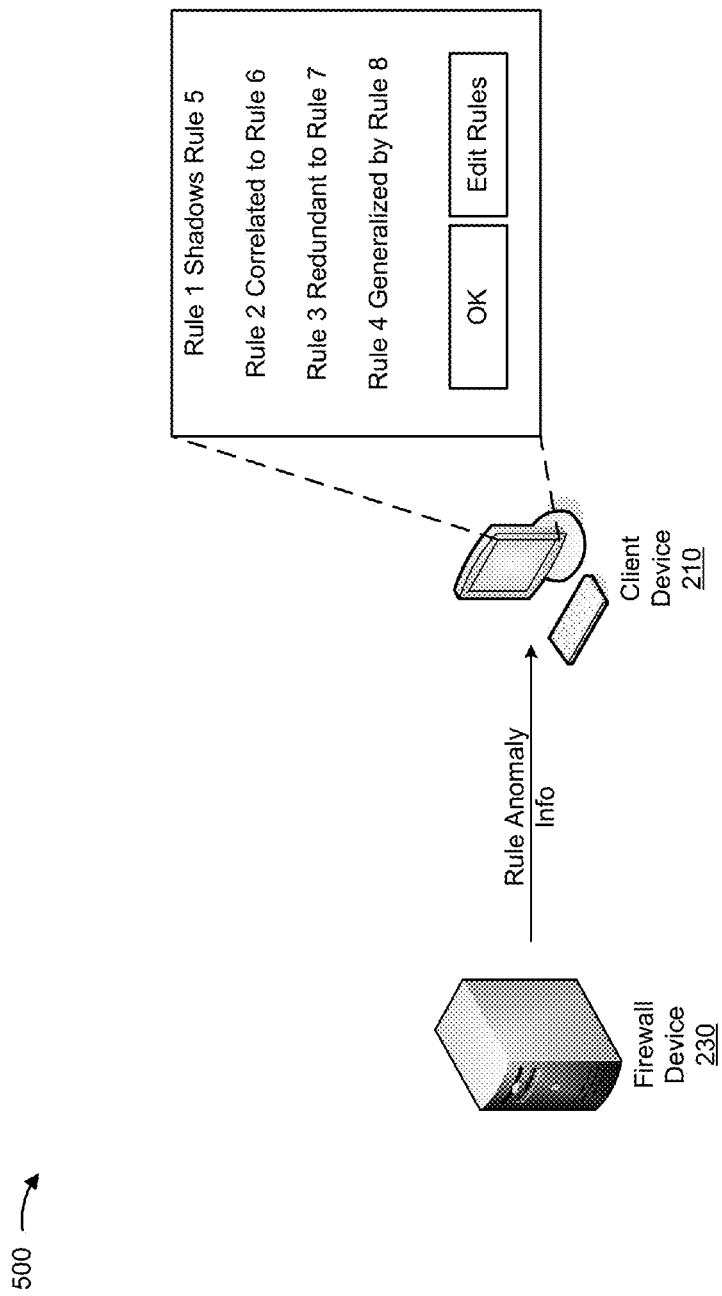

As shown in FIG. 5J, after firewall device 230 adds each rule to the detector tree, firewall device 230 may provide information associated with the detected rule anomalies to client device 210. Client device 210 may then provide, for display, the information associated with the rule anomalies (e.g., to allow the user to view the information associated with the rule anomalies, to allow the user to edit the rule information, etc.).

As indicated above, FIGS. 5A-5J are provided merely as an example. Other examples are possible and may differ from what was described with regard to FIGS. 5A-5J.

Implementations described herein provide a detector tree data structure that organizes rule information, associated with a firewall policy that includes a set of N rules, such that a rule anomaly, associated with a particular rule, may be detected based on a small number of rule comparisons relative to the quantity of N rules.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
   receive rule information associated with a firewall policy,
      the rule information including a set of rules;
   add a rule, of the set of rules, to a detector tree associated with the firewall policy,
      the rule being added to the detector tree as a first leaf node based on a source address, associated with the rule, and as a second leaf node based on a destination address associated with the rule;
   identify one or more other rules to which the rule is to be compared based on adding the rule as the first leaf node and as the second leaf node,
      the one or more other rules being included in the set of rules;
   compare the rule and the one or more other rules;
   detect a rule anomaly based on comparing the rule to the one or more other rules,
      the rule anomaly being associated with a conflict between the rule and another rule of the one or more other rules;
   add, to the first leaf node and based on detecting the rule anomaly, information identifying the rule anomaly and information identifying a first node associated with the other rule and included in the detector tree; and
   add, to the second leaf node and based on detecting the rule anomaly, the information identifying the rule anomaly and information identifying a second node associated with the other rule and included in the detector tree.

2. The device of claim 1, where the one or more processors, when comparing the rule and the one or more other rules, are to:

compare the source address, associated with the rule, and
one or more source addresses corresponding to the one
or more other rules;
compare the destination address, associated with the rule,
and one or more destination addresses corresponding to
the one or more other rules;
compare a service, associated with the rule, and one or
more services corresponding to the one or more other
rules; and
compare an action, associated with the rule, and one or
more actions corresponding to the one or more other
rules.

3. The device of claim 1, where the rule anomaly includes:
a shadowing anomaly;
a correlation anomaly;
a generalization anomaly; or
a redundancy anomaly.

4. The device of claim 1, where the one or more processors, when adding the rule to the detector tree, are to:
add the first leaf node to the detector tree,
the first leaf node corresponding to the source address
associated with the rule; and
add the second leaf node to the detector tree,
the second leaf node corresponding to the destination
address associated with the rule.

5. The device of claim 1, where the one or more processors, when identifying the one or more other rules to which
the rule is to be compared, are to:
identify the one or more other rules based on:
a relationship between the source address, associated
with the rule, and one or more source addresses
corresponding to the one or more other rules, and
a relationship between the destination address, associated with the rule, and one or more destination
addresses corresponding to the one or more other
rules.

6. The device of claim 1, where the one or more processors are further to:
provide information regarding the rule anomaly,
the information regarding the rule anomaly being provided to allow a user, associated with the firewall
policy, to edit the firewall policy based on the
information regarding the rule anomaly.

7. The device of claim 1, where the one or more processors are further to:
delete the rule or the other rule based on detecting the rule
anomaly and based on an order associated with the set
of rules.

8. A computer-readable medium storing instructions, the
instructions comprising:
one or more instructions that, when executed by one or
more processors, cause the one or more processors to:
receive rule information associated with a firewall
policy,
the rule information including a set of rules;
add a rule, of the set of rules, to a detector tree
associated with the firewall policy,
the rule being added to the detector tree as a first leaf
node based on a source address, associated with
the rule, and as a second leaf node based on a
destination address associated with the rule;
identify one or more other rules to which the rule is to
be compared based on adding the rule as the first leaf
node and as the second leaf node,
the one or more other rules being included in the set
of rules;
compare the rule and the one or more other rules;
detect a rule anomaly based on comparing the rule to
the one or more other rules,
the rule anomaly being associated with a conflict
between the rule and another rule of the one or
more other rules;
add, to the first leaf node and based on detecting the
rule anomaly, information identifying the rule
anomaly and information identifying a first node
associated with the other rule and included in the
detector tree; and
add, to the second leaf node and based on detecting the
rule anomaly, the information identifying the rule
anomaly and information identifying a second node
associated with the other rule and included in the
detector tree.

9. The computer-readable medium of claim 8, where the
one or more instructions, that cause the one or more processors to compare the rule and the one or more other rules,
cause the one or more processors to:
compare the source address, associated with the rule, and
one or more source addresses corresponding to the one
or more other rules;
compare the destination address, associated with the rule,
and one or more destination addresses corresponding to
the one or more other rules;
compare a service, associated with the rule, and one or
more services corresponding to the one or more other
rules; and
compare an action, associated with the rule, and one or
more actions corresponding to the one or more other
rules.

10. The computer-readable medium of claim 8, where the
rule anomaly includes:
a shadowing anomaly;
a correlation anomaly;
a generalization anomaly; or
a redundancy anomaly.

11. The computer-readable medium of claim 8, where the
one or more instructions, that cause the one or more processors to add the rule to the detector tree, cause the one or
more processors to:
add the first leaf node to the detector tree,
the first leaf node corresponding to the source address
associated with the rule; and
add the second leaf node to the detector tree,
the second leaf node corresponding to the destination
address associated with the rule.

12. The computer-readable medium of claim 8, where the
one or more instructions, that cause the one or more processors to identify the one or more other rules to which the
rule is to be compared, cause the one or more processors to:
identify the one or more other rules based on:
a relationship between the source address, associated
with the rule, and one or more source addresses
corresponding to the one or more other rules, and
a relationship between the destination address, associated with the rule, and one or more destination
addresses corresponding to the one or more other
rules.

13. The computer-readable medium of claim 8, where the
one or more instructions, when executed by the one or more
processors, further cause the one or more processors to:
automatically resolve the rule anomaly based on detecting
the rule anomaly.

14. The computer-readable medium of claim 13, where
the one or more instructions, that cause the one or more processors to automatically resolve the rule anomaly, cause the one or more processors to:

modify one or more of the source address, the destination address, or an action associated with rule based on detecting the rule anomaly.

15. A method, comprising:

receiving, by a device, rule information associated with a firewall policy, the rule information including a set of rules;

adding, by the device, a rule, of the set of rules, to a detector tree associated with the firewall policy, the rule being added to the detector tree as a first leaf node based on a source address, associated with the rule, and as a second leaf node based on a destination address associated with the rule;

identifying, by the device, a group of rules to which the rule is to be compared based on adding the rule as the first leaf node and as the second leaf node, the group of rules being included in the set of rules;

comparing, by the device, the rule and the group of rules;

detecting, by the device, a rule anomaly based on comparing the rule to the group of rules, the rule anomaly being associated with a conflict between the rule and another rule of the group of rules;

adding, by the device, to the first leaf node and based on detecting the rule anomaly, information identifying the rule anomaly and information identifying a first node associated with the other rule and included in the detector tree; and adding, by the device, to the second leaf node, and based on detecting the rule anomaly, the information identifying the rule anomaly and information identifying a second node associated with the other rule and included in the detector tree.

16. The method of claim 15, where comparing the rule and the group of rules comprises:

comparing the source address, associated with the rule, and a group of source addresses corresponding to the group of rules;

comparing the destination address, associated with the rule, and a group of destination addresses corresponding to the group of rules;

comparing a service, associated with the rule, and a group of services corresponding to the group of rules; and comparing an action, associated with the rule, and a group of actions corresponding to the group of rules.

17. The method of claim 15, where the rule anomaly includes:

a shadowing anomaly;

a correlation anomaly;

a generalization anomaly; or a redundancy anomaly.

18. The method of claim 15, where identifying the group of rules to which the rule is to be compared comprises:

identifying the group of rules based on:

a relationship between the source address, associated with the rule, and a group of source addresses corresponding to the group of rules, and a relationship between the destination address, associated with the rule, and a group of destination addresses corresponding to the group of rules.

19. The method of claim 15, further comprising:

providing information associated with the rule anomaly, the information associated with the rule anomaly being provided to allow a user, associated with the firewall policy, to edit the firewall policy based on the information associated with the rule anomaly.

20. The method of claim 15, further comprising:

providing information associated with a resolution of the rule anomaly; and receiving, based on providing the information associated with the resolution, an approval of the resolution or a modification of the resolution.

\* \* \* \* \*